J. M. STONE.
SEPARATOR.
APPLICATION FILED NOV. 18, 1907.

940,212.

Patented Nov. 16, 1909.

Witnesses:

Inventor:

UNITED STATES PATENT OFFICE.

JOHN M. STONE, OF NEWBERG, OREGON.

SEPARATOR.

940,212.　　　　　Specification of Letters Patent.　　Patented Nov. 16, 1909.

Application filed November 18, 1907. Serial No. 402,772.

*To all whom it may concern:*

Be it known that I, JOHN M. STONE, a citizen of the United States, residing at Newberg, in the county of Yamhill and State of Oregon, have invented certain new and useful Improvements in Separators, of which the following is a specification.

This invention relates to separators for treating grain and similar products, and has for its object to provide such a device which will be peculiarly effective in operation, which will be simple in construction, and which will occupy a minimum of space.

A particular object of the invention is to provide a screen of a peculiarly novel and effective type for use in treating grain or other vegetable product similar in shape to wheat.

Another object is to provide a separator having a series of superposed screens and ducts disposed in a peculiar relation for successive treatment of material.

Other objects and advantages will be apparent from the following description, and it will be understood that changes in the specific structure shown and described may be made within the scope of the claims, and that any suitable materials may be used without departing from the spirit of the invention.

Figure 1:
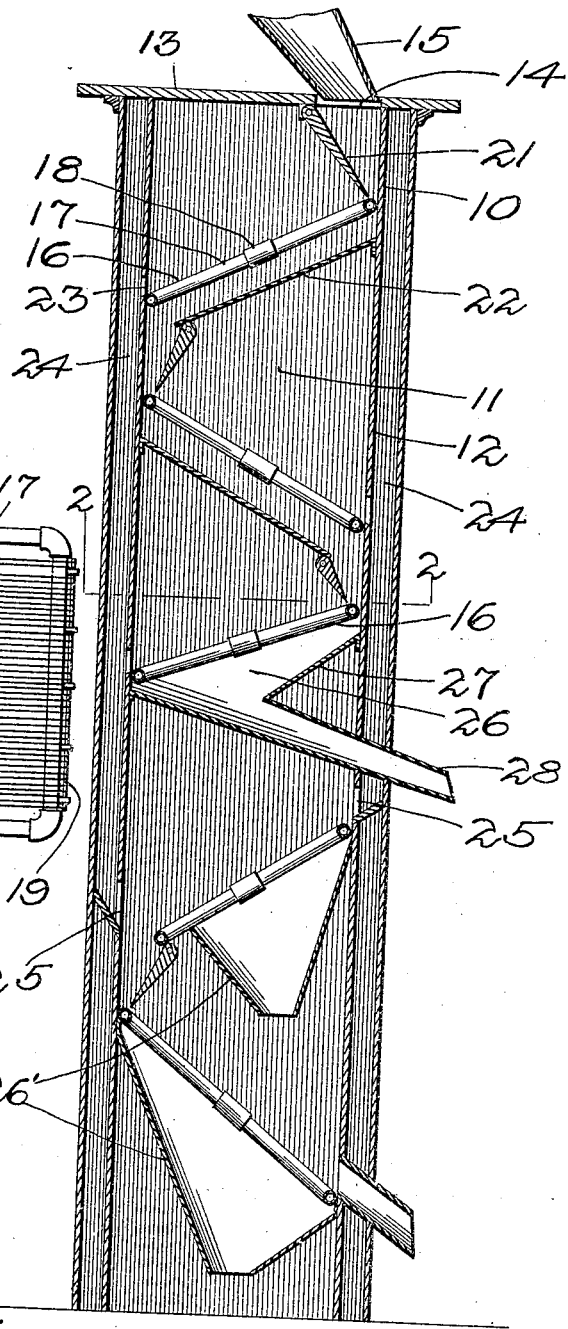
Figure 2:
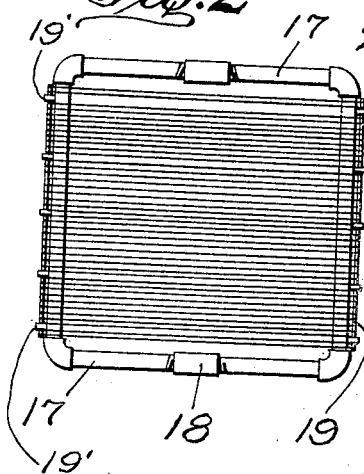

In the drawings forming a portion of this specification, and in which like numerals of reference indicate similar parts in the several views, Figure 1 is a longitudinal section through the device, Fig. 2 is a transverse section on the line 2—2 of Fig. 1.

Referring to the drawings, there is shown a separator including a rectangular casing 10 comprising side walls 11 and 12, and a top 13. The top is provided with an opening 14 adapted to receive a chute 15 for directing grain into the separator. Spaced vertically in the casing, there is a plurality of screens 16 inclined alternately in opposite directions. The screens comprise frames of metal tubing formed of oppositely disposed approximately U shaped portions 17 having their ends threaded and opposedly engaged in right and left threaded sleeves 18 adapted for adjustment to force the sections apart. Stretched between the opposite sections 17, there are a plurality of parallel wires on bars 19, the wires being engaged over the central parallel portion of the members 17, and being held in spaced relation by means of grooves formed upon the members 17 to hold the wires securely against lateral displacement. Disposed beneath the opening 14 there is a hinged or pivoted valve member or shutter 21 held yieldably with its lower end disposed closely against the adjacent wall 12, and in close juxtaposition to the uppermost screen 16, and adapted to retard movement of material entering the receptacle, spreading such material laterally over the screen and preventing it from bounding and rebounding upon the surface of the screen. The valve 12 should be so adjusted as to be readily operated by the weight of material passing therethrough.

Beneath each of the screens 16 there is a cant board 22 inclined in parallel spaced relation with the screen, stopping short of the wall 12 at its lower end and carrying a valve 21 similar to that above described. At the lower end of certain of the screens in the upper part of the separator, slots 23 are formed in the adjacent wall 12, adapted to receive the coarser material from the screen. Chutes 24 are formed outwardly of the walls 12 to receive such material, these chutes ending at slots 25 formed at the upper edges of certain of the screens in the lower portion of the separator, to return the material into the casing 10 for retreatment as will be subsequently indicated. The screen next above the slots 25 has disposed thereunder a hopper 26 comprising a funnel portion 27 and a central downwardly inclined spout 28 passing through the casing 10 and chute 24 to a suitable point of delivery. The purpose of the upper screen is to allow the successive passage therethrough of finer particles to the hopper 26, and the lower screens are intended a further refinement of the material removed by the upper screen. Each of the lower screens is provided with a funnel member 26′ similar to that above described, so that products of various degrees of fineness may be removed separately.

It will be understood, that the angle at which the screens are disposed with relation to the perpendicular may be varied to suit various kinds of material to be treated.

It will also be understood that any desirable means for shaking the screens may be utilized; but, as this does not comprise a part of the novel features of this invention, it is not believed essential to illustrate this detail.

It will be noted that the strands of each screen are formed of one continuous wire, carried by suitable bar members 19 supported by outwardly projecting lugs 19', spaced longitudinally of the central portion of the members 17. The wires are secured by their opposite ends to the opposite sides of the respective frames 16. It will thus be seen that if greater strain is sustained by a local portion of the screen, inducing a few strands to yield and loosen, the tension upon the whole screen may be evenly taken up by means of the sleeves 18, the wire adjusting itself evenly upon the bar 19, as will be understood.

What is claimed is:—

1. A separator including a casing having a plurality of alternately inclined screen members therein, a receiving opening in the top of the casing, openings through the casing adjacent the bases of certain of the screens, and chutes adapted to receive material from said openings, inclined floor members disposed in spaced relation beneath certain of said screens, said floor members stopping short of the lower ends of the screens, pivoted vanes attached beneath the opening in the top of the casing and the lower edges of said inclined floors, to yieldably retard movement of material thereby and means for diverting screened material from the casing at various points.

2. A separator including a casing having a plurality of alternately inclined screen members therein, a receiving opening in the top of the casing, openings through the casing adjacent the bases of certain of the screens, chutes arranged to receive material from said openings, means for diverting screened material from the casing at various points, and means for directing material from the chutes into the casing at certain points.

3. In a device of the class described, the combination with a casing of alternately inclined screen members, said casing having openings therethrough adjacent the bases of certain of the screens, inclined deflectors disposed in spaced relation with certain of the screens and stopping short of the lower ends of the screens, means for diverting screened material from the casing at various points and means for conducting into the casing below the last named means material passing over certain of the screens.

JOHN M. STONE.

Witnesses:
A. C. SEELY,
H. G. MILLER.